United States Patent
Huang

(10) Patent No.: US 9,775,137 B2
(45) Date of Patent: Sep. 26, 2017

(54) RADIO RESOURCE MANAGEMENT METHOD, DEVICE AND SYSTEM

(71) Applicant: ZTE Corporation, Shenzhen (CN)

(72) Inventor: Yada Huang, Shenzhen (CN)

(73) Assignee: XI'AN ZTE NEW SOFTWARE COMPANY LIMITED, Xi'an (CN)

(*) Notice: Subject to any disclaimer, the term of this patent is extended or adjusted under 35 U.S.C. 154(b) by 45 days.

(21) Appl. No.: 14/761,980

(22) PCT Filed: Sep. 23, 2013

(86) PCT No.: PCT/CN2013/084028
§ 371 (c)(1),
(2) Date: Jul. 20, 2015

(87) PCT Pub. No.: WO2014/110914
PCT Pub. Date: Jul. 24, 2014

(65) Prior Publication Data
US 2015/0319748 A1  Nov. 5, 2015

(30) Foreign Application Priority Data
Jan. 18, 2013  (CN) .......................... 2013 1 0019303

(51) Int. Cl.
*H04W 4/00* (2009.01)
*H04W 72/04* (2009.01)
(Continued)

(52) U.S. Cl.
CPC ....... *H04W 72/0406* (2013.01); *H04W 24/08* (2013.01); *H04W 36/0033* (2013.01);
(Continued)

(58) Field of Classification Search
None
See application file for complete search history.

(56) References Cited

U.S. PATENT DOCUMENTS

2008/0268844 A1* 10/2008 Ma .................... H04W 36/0033
455/436
2009/0016297 A1  1/2009 Lee
(Continued)

FOREIGN PATENT DOCUMENTS

| CN | 101026857 A | 8/2007 |
|---|---|---|
| CN | 101345986 A | 1/2009 |
| CN | 101345987 A | 1/2009 |

OTHER PUBLICATIONS

International Search Report for corresponding application PCT/CN2013/084028 filed Sep. 23, 2013; Mail date Dec. 26, 2013.
(Continued)

*Primary Examiner* — Anh-Vu Ly
(74) *Attorney, Agent, or Firm* — Cantor Colburn LLP

(57) ABSTRACT

The disclosure provides a Radio Resource Management (RRM) method, device and system. The method includes that: a first network element judges whether a target Evolved Universal Terrestrial Radio Access Network NodeB (eNB) of a terminal is a configured eNB or not, wherein the configured eNB is an eNB pre-storing context information of the terminal; and under the condition that the target eNB is the configured eNB, the first network element sends a notice of performing communication according to the corresponding context information to the configured eNB and the terminal respectively. By the disclosure, problems of serial Handover (HO) in a related technology are solved, and an effect of increasing an HO success rate is achieved.

16 Claims, 10 Drawing Sheets

(51) Int. Cl.
*H04W 76/06* (2009.01)
*H04W 24/08* (2009.01)
*H04W 36/00* (2009.01)
*H04W 88/08* (2009.01)
*H04W 88/02* (2009.01)

(52) U.S. Cl.
CPC ........ *H04W 76/06* (2013.01); *H04W 36/0072* (2013.01); *H04W 88/02* (2013.01); *H04W 88/08* (2013.01)

(56) References Cited

U.S. PATENT DOCUMENTS

| | | | | |
|---|---|---|---|---|
| 2009/0207808 A1* | 8/2009 | McCann | ........... | H04W 36/0016 370/331 |
| 2009/0216906 A1* | 8/2009 | Weniger | ................ | H04L 41/147 709/246 |
| 2010/0330993 A1* | 12/2010 | Kone | ................ | H04W 36/0055 455/436 |
| 2011/0319115 A1* | 12/2011 | Racz | ..................... | H04W 24/10 455/514 |
| 2012/0003962 A1* | 1/2012 | Jeon | .................. | H04W 36/0083 455/411 |
| 2013/0210422 A1* | 8/2013 | Pani | ........................ | H04W 8/02 455/423 |
| 2015/0289179 A1* | 10/2015 | Liu | ........................ | H04W 48/20 370/331 |

OTHER PUBLICATIONS

Alcatel;, "Forwarding Mechanism for Intra-Access System Handover", 3GPP Draft; R3-060028 Intra Access Mobilty, 3GPP, France, vol. RAN WG3, No. Sophia Antipolis, Jan. 4, 2006, XP050158963.

European Search Report for corresponding application EP 13 87 1764; Report dated Jan. 5, 2016.

ZTE; Context Pre-Configuration for Intra-radio access mobility, Handover in LTE_Active, 3GPP Draft, 3GPP Project, vol. RAN WG3, No. Denver USA, Feb. 8, 2006, XP050159111.

* cited by examiner

RADIO RESOURCE MANAGEMENT METHOD, DEVICE AND SYSTEM

TECHNICAL FIELD

The disclosure relates to the field of communication, and in particular to a Radio Resource Management (RRM) method, device and system.

BACKGROUND

Along with the constant evolution of a wireless communication technology and protocol standard, a mobile packet service has experienced great development, and a data throughput capability of a single terminal has been continuously improved. For example, a Long Term Evolution (LTE) system may support data transmission at a maximum downlink rate of 100 Mbps within a 20 M bandwidth, and a data transmission rate of a follow-up LTE Advanced (LTE-A) system may further be increased, and may even reach 1 Gbps.

Inflationary increase of a data service volume of a terminal imposes enormous pressure and challenges for a service capability and deployment strategy of the terminal. An operating company needs to enhance an existing network deployment and communication technology on one hand, and on the other hand, expects to accelerate the popularization of a new technology and network extension, thereby fulfilling the aim of rapidly improving network performance. Along with the development of a mobile communication system up to now, it is more and more difficult to provide economic, flexible and high-capability service only by enhancing macro networks, so that a network strategy of deploying Low Power Nodes (LPN) to provide a small cell coverage becomes an attractive solution, particularly in the aspect of providing good user experiences for a user in an indoor/outdoor hotspot area with a large transmitted data volume.

Enhancement in small cell deployment has been confirmed by the Third Generation Partnership Project (3GPP) to be one of the most interesting issues in future network development. Small cells are deployed in a coverage of a macro network, which may make transmission, mobility, security, interference and the like greatly different from those of a conventional macro network, and in a process of independently providing service for a terminal by each Evolved Universal Terrestrial Radio Access Network NodeB (eNB), there may exist multiple problems, and service requirements on large data volume and high mobility cannot be met; and because of practical limitations, historical factors and the like, backhauls of an LPN are diversified, and each interface has different characteristics, and is limited to coordinate and interact with the macro network. Therefore, in a scenario deployed with small cells, how to maintain a good coordination mechanism with a Macro eNB (MeNB) by virtue of its characteristics to provide optimal communication service for User Equipment (UE) to further meet requirements of higher bandwidth, higher performance, lower cost, higher security and applicability to multiple backhauls is an important topic urgent to be solved in the future development of an LTE communication system.

The deployment of a large number of small cells also brings many new problems, for example, the deployment of the small cells may cause frequent mobile processes of a terminal between the small cells and macro cells and between the small cells. Frequent Handover (HO) may cause higher signalling impact between a Core Network (CN) and an eNB, and meanwhile, frequent HO may also cause frequent interruption of a service and increase the probability of call drop of the terminal.

FIG. 1 is a topology diagram of a typical LTE/LTE-A network according to a related technology. As shown in FIG. 1, UE moves around cell 1-1 (Cell1-1), cell 2-1 (Cell2-1), cell 2-2 (Cell2-2) and cell 3-1 (Cell3-1), eNBs are network control nodes of cells, one eNB may control one or more cells, and as shown in FIG. 1, Cell1-1 is controlled by eNB1, Cell2-1 and Cell2-2 are controlled by eNB2, and Cell3-1 is controlled by eNB3. The eNBs are connected through X2 interfaces, and each eNB is connected with a CN through an S1 interface.

FIG. 2 is a flowchart of X2 HO of LTE according to the related technology, and as shown in FIG. 2, the flow includes the following steps:

Step 202: UE sends a measurement report to a source eNB.

Step 204: an HO decision is made.

The HO decision is made by the source eNB. A making basis may be the measurement port sent by the UE, or some own measurement information or local load information of the source eNB, so when to initiate HO is determined according to own algorithm of an implementer. After HO is determined to be initiated, Step 206 is executed.

Step 206: the source eNB sends an HO request to a target eNB.

Once it is determined that cross-eNB HO is required, an eNB where a target cell is located is the target eNB, and because the target eNB does not have context information of the UE, the source eNB sends necessary configuration information of the UE on the source eNB to the target eNB by sending the HO request to the target eNB. Wherein, the HO request includes the context information of the UE and Radio Resource Control (RRC) context information. The context information of the UE may include information such as a corresponding identifier of X2/S1 of the UE, a context (including address information of a ground transmission network, Quality of Service (QoS) and the like) of an E-UTRAN Radio Access Bearer (E-RAB), security-related information and terminal capability. An RRC context is a radio resource configuration of a cell where the UE is located, and includes information such as a Cell Radio Network Temporary Identifier (C-RNTI) of the UE, an access layer configuration, a physical cell ID and a short Message Authentication Code-Integrity (MAC-I) for RRC reconfiguration.

Step 208: admission control is performed.

The target eNB configures new context information according to the context information of the source eNB and a resource state of the target eNB, and modifies the RRC configuration of the UE according to a local radio resource condition if necessary, for example, modifies a new physical cell ID, a new C-RNTI, a random access dedicated resource, broadcast information of a new cell, updated security information and the like.

Step 210: HO request Acknowledgement (Ack) is sent.

The target eNB generates RRC Reconfiguration (Reconfig) according to the modified configuration, and sends RRC Reconfig to the source eNB through HO request Ack.

Step 212: RRC Reconfig is forwarded.

The source eNB receives RRC Reconfig from the target eNB, performs integrity protection and encryption processing on RRC Reconfig, and sends RRC Reconfig to the UE.

Step 214: the UE performs random access.

The UE performs random access in the target cell after receiving RRC Reconfig.

Step 216: the UE sends RRC Conn.Reconf.Complete.

The UE returns RRC Conn.Reconf.Complete to the target cell after successfully performing random access in the target cell.

Step 218: the target eNB sends a path switch request.

The target eNB then sends the path switch request to a Mobile Management Entity (MME).

Step 220: the MME sends a modify bearer request to a serving gateway.

Step 222: the serving gateway switches a Downlink (DL) path.

The serving gateway modifies a data path of the CN from the source eNB to the target eNB.

Step 224: the serving gateway sends a modify bearer response.

Step 226: the MME returns a path request Ack to the target eNB.

Step 228: the target eNB sends a UE context release message to the source eNB.

Step 230: the source eNB releases a resource.

The source eNB releases a context of the UE and a related dedicated resource.

From the above flow of HO of the LTE system, the whole HO is a serial process, that is, it is necessary to determine the target eNB at first, then the source eNB and the target eNB finish the context preparation of the UE, next the UE finishes the access of the target eNB, and finally the CN performs path HO. By characteristics of such a serial process, a failure of any intermediate step may cause a failure of the whole flow, a time delay of any step may cause a time delay of the whole system, and it is necessary to execute the whole flow during every HO even if it is back and forth HO between the same two cells.

When a large number of small cells are deployed, for the problem of high HO failure rate during HO in the related technology, there is yet no effective solution.

SUMMARY

The embodiment of the disclosure provides an RRM method, device and system, so as to at least solve the problem.

According to one aspect of the embodiment of the disclosure, an RRM method is provided, which includes that: a first network element judges whether a target eNB of a terminal is a configured eNB or not, wherein the configured eNB is an eNB pre-storing context information of the terminal; and under the condition that the target eNB is the configured eNB, the first network element sends a notice of performing communication according to the corresponding context information to the configured eNB and the terminal respectively.

Preferably, before the first network element judges whether the target eNB is the configured eNB or not, the method further includes that: the first network element determines the configured eNB, and sends the context information to the configured eNB; and the first network element receives and stores resource configuration information returned by the configured eNB according to the context information, and stores information of the configured eNB into a configured eNB list.

Preferably, after the first network element receives the resource configuration information, the method further includes that: the resource configuration information is sent to the terminal to enable the terminal to communicate with the configured eNB according to the resource configuration information.

Preferably, under the condition that the first network element is an eNB, the first network element sends the configured eNB list to a new first network element.

According to another aspect of the embodiment of the disclosure, an RRM method is provided, which includes that: a configured eNB receives a notice of communicating with a terminal from a first network element, wherein the configured eNB is an eNB pre-storing context information of the terminal; and the configured eNB communicates with the terminal under the instruction of the notice according to the context information.

Preferably, before the configured eNB receives the notice, the method further includes that: the configured eNB performs resource configuration according to the context information, and sends resource configuration information to the terminal through the first network element.

Preferably, communication with the terminal according to the context information includes communication with the terminal according to the resource configuration information.

Preferably, the method further includes at least one of the following steps that: the configured eNB releases the context information of the terminal according to a received release request; and the configured eNB modifies the context information of the terminal, and notifies the first network element.

Preferably, after the configured eNB communicates with the terminal, the method further includes that: under the condition that the first network element is an eNB, the configured eNB stops communicating with the terminal after receiving a communication stopping notice from a new first network element; and under the condition that the first network element is an independent context manager, the configured eNB stops communicating with the terminal after receiving a communication stopping notice from the first network element, wherein the context manager is connected with the configured eNB, and is configured to manage the context information.

According to another aspect of the embodiment of the disclosure, an RRM method is provided, which includes that: a terminal receives resource configuration information sent by a configured eNB through a first network element, wherein the configured eNB is an eNB pre-storing context information of the terminal; and the terminal communicates with the configured eNB according to the resource configuration information after receiving a notice of communicating with the configured eNB from the first network element.

According to another aspect of the embodiment of the disclosure, an RRM device is provided, which is located in a first network element, the device including: a judgment component, configured to judge whether a target eNB of a terminal is a configured eNB or not, wherein the configured eNB is an eNB pre-storing context information of the terminal; and a sending component, configured to, under the condition that the target eNB is the configured eNB, send a notice of performing communication according to the corresponding context information to the configured eNB and the terminal respectively.

Preferably, the sending component is further configured to determine the configured eNB, and send the context information to the configured eNB; and the device further includes a receiving component, configured to receive and store resource configuration information returned by the configured eNB according to the context information, and store information of the configured eNB into a configured eNB list.

Preferably, the sending component is further configured to send the resource configuration information to the terminal to enable the terminal to communicate with the configured eNB according to the resource configuration information.

Preferably, the sending component is further configured to, under the condition that the first network element is an eNB, send the configured eNB list to a new first network element.

According to another aspect of the embodiment of the disclosure, an RRM device is provided, which is located in a configured eNB, wherein the configured eNB is an eNB pre-storing context information of a terminal, the device including: an eNB receiving component, configured to receive a notice of communicating with the terminal from a first network element; and an eNB communication component, configured to communicate with the terminal under the instruction of the notice according to the context information.

Preferably, the device further includes an eNB configuration component, configured to perform resource configuration according to the context information, and send resource configuration information to the terminal through the first network element.

Preferably, the eNB communication component is configured to communicate with the terminal according to the resource configuration information.

Preferably, the device further includes at least one of: a releasing component, configured to release the context information of the terminal according to a received release request; and a modification component, configured to modify the context information of the terminal, and notify the first network element.

According to another aspect of the embodiment of the disclosure, an RRM device is provided, which is located in a terminal and includes: a terminal receiving component, configured to receive resource configuration information sent by a configured eNB through a first network element, wherein the configured eNB is an eNB pre-storing context information of the terminal; and a terminal communication component, configured to communicate with the configured eNB according to the resource configuration information after receiving a notice of communicating with the configured eNB from the first network element.

According to another aspect of the embodiment of the disclosure, an RRM system is provided, which includes: a terminal, configured to receive resource configuration information of a configured eNB before cross-eNB HO of the terminal, and then communicate with the configured eNB according to the corresponding resource configuration information under the condition that the terminal is handed over to a target eNB and the target eNB is the configured eNB; a working eNB, configured to determine at least one configured eNB according to a preset condition before the cross-eNB HO of the terminal, send context information of the terminal to the configured eNB, and send the received resource configuration information of the configured eNB to the terminal; and the at least one configured eNB, configured to receive and store the context information before the cross-eNB HO of the terminal, perform corresponding resource configuration according to the context information, send the resource configuration information to the working eNB, and communicate with the terminal according to the resource configuration information under the condition that the configured eNB is the target eNB.

According to the embodiment of the disclosure, the first network element judges whether the target eNB of the terminal is the configured eNB or not, wherein the configured eNB is an eNB pre-storing the context information of the terminal, and under the condition that the target eNB is the configured eNB, the first network element sends the notice of performing communication according to the corresponding context information to the configured eNB and the terminal respectively, so that problems of serial HO in the related technology are solved, and an effect of increasing an HO success rate is further achieved.

BRIEF DESCRIPTION OF THE DRAWINGS

The drawings described here are adopted to provide further understanding of the disclosure, and form a part of the disclosure. Schematic embodiments of the disclosure and description thereof are adopted to explain the disclosure and not intended to improperly limit the disclosure. In the drawings:

FIG. 11 b is a second network topology diagram of a context manager according to an embodiment of the disclosure;

DETAILED DESCRIPTION OF THE EMBODIMENTS

The disclosure is described below with reference to the drawings and the embodiments in detail. It is important to note that the embodiments in the disclosure and characteristics in the embodiments can be combined under the condition of no conflicts.

In order to facilitate description, a configured eNB in the following embodiment is an eNB pre-storing context information of a terminal, and specifically, the configured eNB is an eNB pre-storing the context information of the terminal before HO of the terminal. An eNB becomes a configured eNB after receiving and storing context information and/or radio resource configuration information of a terminal, and here, the reason why the eNB storing the radio resource configuration information is a configured eNB is that the radio resource configuration information is generated according to the context information. Configured eNBs are further divided into working eNBs and non-working eNBs according to whether they directly communicate with terminals or not, the configured eNBs directly wirelessly communicating with the terminals are working eNBs, and non-working eNBs cannot directly wirelessly communicate with the terminals. A non-working eNB can indirectly communicate with a terminal through a working eNB. A configured eNB may usually be added into a configured eNB list, and the eNB newly added into the configured eNB list is in a non-working state in default, that is, the eNB newly added into the configured eNB list is a non-working eNB. A terminal may correspond to more than one non-working eNB and at least one working eNB, and a terminal with a multi-connection capability may communicated with more than one working eNB. A first network element is a working eNB of a terminal or an independent context manager, wherein the working eNB is a configured eNB directly communicating with the terminal, and the independent context manager is connected with at least one configured eNB, and is configured to manage context information of the terminal.

Embodiment 1

Figure 3:
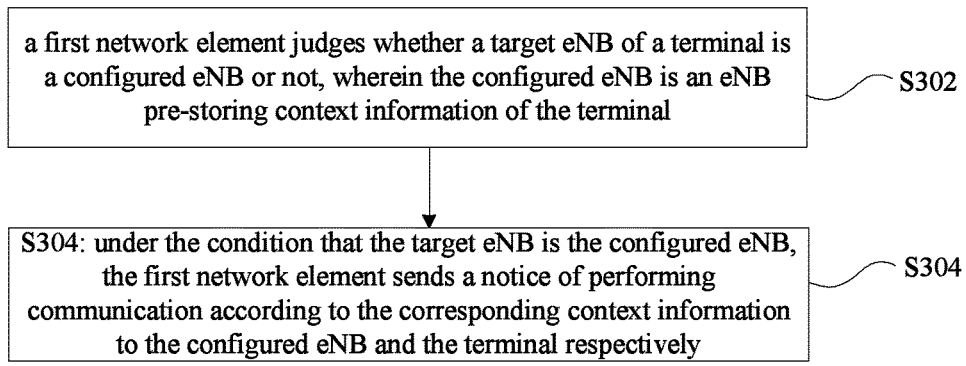
FIG. 3 is a first flowchart of an RRM method according to an embodiment of the disclosure.

The embodiment of the disclosure provides an eNB configuration method, FIG. 3 is a first flowchart of an RRM method according to an embodiment of the disclosure, and as shown in FIG. 3, the flow includes the following steps:

Step 302: a first network element judges whether a target eNB of a terminal is a configured eNB or not, wherein the configured eNB is an eNB pre-storing context information of the terminal.

Step 304: under the condition that the target eNB is the configured eNB, the first network element sends a notice of performing communication according to the corresponding context information to the configured eNB and the terminal respectively.

In the embodiment of the disclosure, an original serial mobile process of the terminal moving between eNBs is converted into two relatively independent parallel management processes of configured eNB management and working eNB management. In addition, a configured and non-working eNB state is added, so that the terminal may be preconfigured before entering the eNB to shorten an eNB replacement flow, and meanwhile, the terminal is not required to instantly delete the corresponding configuration after leaving the eNB to avoid reconfiguration if the terminal returns to the eNB. In such a manner, a signalling amount and signalling size in the mobile process are reduced, thereby accelerating eNB HO, reducing an eNB HO time delay, shortening service interruption, further increasing mobile throughput and enhancing mobile robustness.

The configured eNB may be an MeNB, and may also be a small cell eNB. The deployment of a large number of small cells in the related technology may cause frequent mobile processes between the small cells and macro cells, and frequent HO may cause higher signalling impact between a CN and the eNB. By the embodiment of the disclosure, the problem may be solved. Of course, the same benefits of, for example, enhancing HO reliability, reducing HO interruption, increasing service throughput, reducing signalling overhead and reducing the HO time delay may also achieved in a conventional mobile scenario.

In addition, in the related technology, a timer TRELOCprep may be started after a source eNB sends an HO request to a target eNB, and after a response is received from the target eNB, TRELOCprep may be stopped, and TX2RELOCoverall may be started to wait for the target eNB to send terminal context release; and when one of the two timers is overtime, an abnormal flow is executed for HO cancellation or terminal context release. However, in the process of the embodiment of the disclosure, when the first network element may not initiate a terminal context releasing flow within a specified time after receiving a response of the configured eNB, that is, the terminal instantly enters a cell of a new eNB without similar TX2RELOCoverall waiting after receiving a response of the new eNB, the terminal context of the original eNB where the cell is located may be instantly released, and meanwhile, the terminal contexts of the original working eNB and the new eNB may be simultaneously stored.

Before the first network element judges whether the target eNB is the configured eNB or not, the method may further include that: the first network element determines the configured eNB, and sends the context information to the configured eNB; and the first network element receives and stores resource configuration information returned by the configured eNB according to the context information, and stores information of the configured eNB into a configured eNB list. The resource configuration information may include a radio resource configuration and/or an inter-eNB transmission configuration, such as a transmission network address. Generally, an eNB configuration process is executed in advance by a network element where a context manager is located before the terminal enters a cell where the configured eNB is located. After configuration, the network element where the context manager is located may store resource configuration information returned by the new configured eNB. In such a manner, resource configuration is performed before the HO of the terminal, so that HO time is saved.

After the first network element receives the resource configuration information, the method may further include that: the received resource configuration information of the configured eNB is sent to the terminal to enable the terminal to communicate with the configured eNB according to the resource configuration information. By the step, the terminal may acquire the resource configuration information of the configured eNB in advance, and a network may notify the terminal to communicate with the configured eNB by virtue of the resource configuration information after the terminal enters the cell of the eNB.

Under the condition that the first network element is an eNB, the first network element may further send the configured eNB list to a new first network element. When the terminal is handed over, that is, the terminal is handed over to the target eNB, i.e. a certain configured eNB, from a working eNB, the first network element is the working eNB, the configured eNB serves as the new first network element, and it is necessary to send the configured eNB list of the original first network element to the new first network element, so that the new first network element may store the configured eNB list to avoid regeneration.

Embodiment 2

Figure 4:
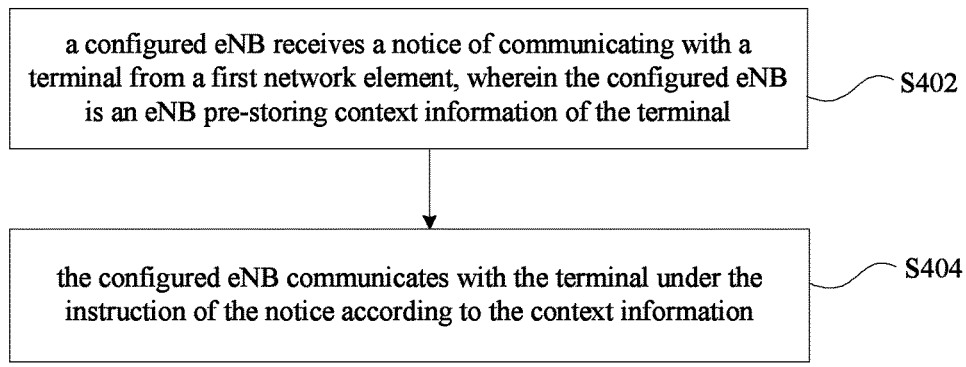
FIG. 4 is a second flowchart of an RRM method according to an embodiment of the disclosure.

The embodiment of the disclosure provides an RRM method, FIG. 4 is a second flowchart of an RRM method according to an embodiment of the disclosure, and as shown in FIG. 4, the flow includes the following steps:

Step 402: a configured eNB receives a notice of communicating with a terminal from a first network element, wherein the configured eNB is an eNB pre-storing context information of the terminal.

Step 404: the configured eNB communicates with the terminal under the instruction of the notice according to the context information.

Preferably, before the configured eNB receives the notice, the method may further include that: the configured eNB performs resource configuration according to the context information, and sends resource configuration information to the terminal through the first network element.

Preferably, communication with the terminal according to the context information includes communication with the terminal according to the resource configuration information.

Preferably, the method may further include at least one of the following steps that: the configured eNB releases the context information of the terminal according to a received release request; and the configured eNB modifies the context information of the terminal, and notifies the first network element.

Preferably, after the configured eNB communicates with the terminal, the method may further include that: under the condition that the first network element is an eNB, the configured eNB stops communicating with the terminal after receiving a communication stopping notice from a new first network element; and under the condition that the first network element is an independent context manager, the configured eNB stops communicating with the terminal after receiving a communication stopping notice from the first network element, wherein the context manager is connected with the configured eNB, and is configured to manage the context information.

Embodiment 3

Figure 5:
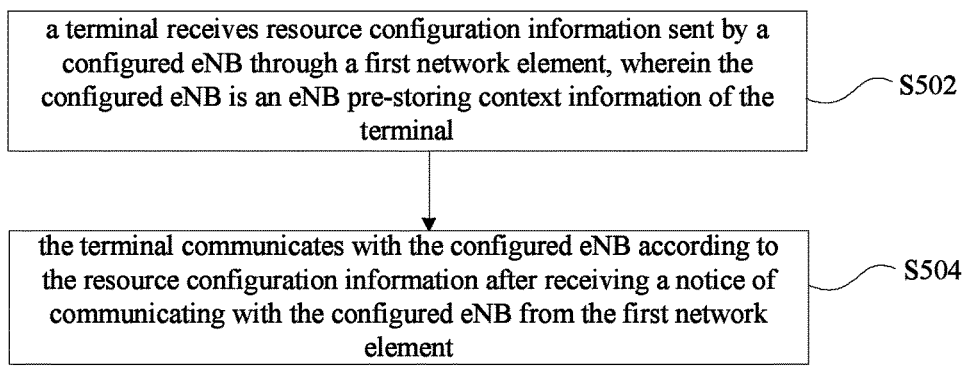
FIG. 5 is a third flowchart of an RRM method according to an embodiment of the disclosure.

The embodiment of the disclosure further provides an RRM method, FIG. 5 is a third flowchart of an RRM method according to an embodiment of the disclosure, and as shown in FIG. 5, the flow includes the following steps:

Step 502: a terminal receives resource configuration information sent by a configured eNB through a first network element, wherein the configured eNB is an eNB pre-storing context information of the terminal.

Step 504: the terminal communicates with the configured eNB according to the resource configuration information after receiving a notice of communicating with the configured eNB from the first network element.

Preferably, a working eNB and the configured eNB are small cell eNBs.

Embodiment 4

Figure 6:
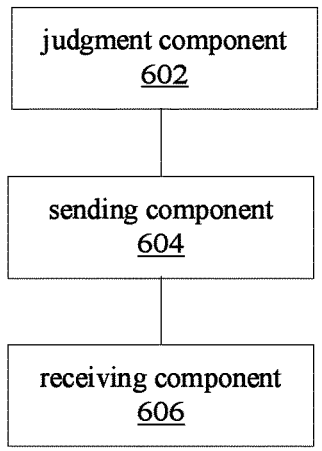
FIG. 6 is a first structure diagram of an RRM device according to an embodiment of the disclosure.

The embodiment of the disclosure provides an RRM device, FIG. 6 is a first structure diagram of an RRM method according to an embodiment of the disclosure, the device is arranged on a first network element, and as shown in FIG. 6, the device includes:

a judgment component 602, configured to judge whether a target eNB of a terminal is a configured eNB or not, wherein the configured eNB is an eNB pre-storing context information of the terminal; and a sending component 604, configured to, under the condition that the target eNB is the configured eNB, send a notice of performing communication according to the corresponding context information to the configured eNB and the terminal respectively.

Preferably, the sending component 604 is further configured to determine the configured eNB, and send the context information to the configured eNB; and the device further includes a receiving component 606, configured to receive and store resource configuration information returned by the configured eNB according to the context information, and store information of the configured eNB into a configured eNB list.

Preferably, the sending component 604 is further configured to send the received resource configuration information of the configured eNB to the terminal to enable the terminal to communicate with the configured eNB according to the resource configuration information.

Preferably, the sending component 604 is further configured to, under the condition that the first network element is an eNB, send the configured eNB list to a new first network element.

Embodiment 5

Figure 7:
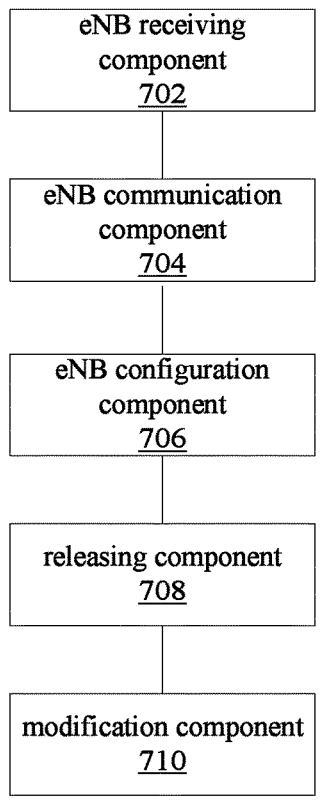
FIG. 7 is a second structure diagram of an RRM device according to an embodiment of the disclosure.

The embodiment of the disclosure provides an RRM device, FIG. 7 is a second structure diagram of an RRM device according to an embodiment of the disclosure, and the device is located in a configured eNB, wherein the configured eNB is an eNB pre-storing context information of a terminal. As shown in FIG. 7, the device includes:

an eNB receiving component 702, configured to receive a notice of communicating with the terminal from a first network element; and an eNB communication component 704, configured to communicate with the terminal under the instruction of the notice according to the context information.

Preferably, the device further includes an eNB configuration component 706, configured to perform resource configuration according to the context information, and send resource configuration information to the terminal through the first network element.

Preferably, the eNB communication component 704 is configured to communicate with the terminal according to the resource configuration information.

Preferably, the device further includes at least one of: a releasing component 708, configured to release the context information of the terminal according to a received release request; and a modification component 710, configured to modify the context information of the terminal, and notify the first network element.

Embodiment 6

Figure 8:
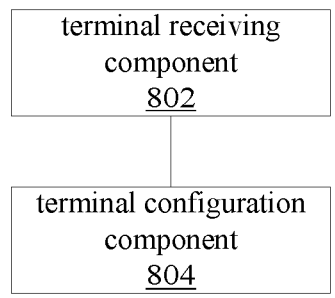
FIG. 8 is a third structure diagram of an RRM device according to an embodiment of the disclosure.

The embodiment of the disclosure provides an RRM device, FIG. 8 is a third structure diagram of an RRM device according to an embodiment of the disclosure, and as shown in FIG. 8, the device includes:

a terminal receiving component 802, configured to receive resource configuration information sent by a configured eNB through a first network element, wherein the configured eNB is an eNB pre-storing context information of the terminal; and a terminal communication component 804, configured to communicate with the configured eNB according to the resource configuration information after receiving a notice of communicating with the configured eNB from the first network element.

Embodiment 7

Figure 9:
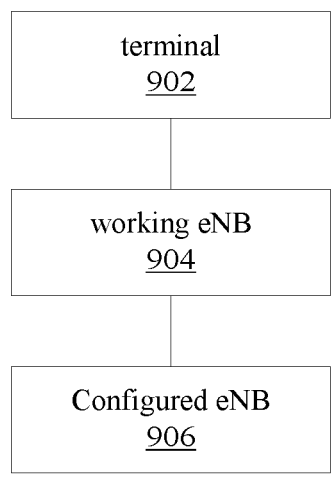
FIG. 9 is a structure diagram of an RRM system according to an embodiment of the disclosure.

The embodiment of the disclosure provides an RRM system, FIG. 9 is a structure diagram of an RRM system according to an embodiment of the disclosure, and as shown in FIG. 9, the system includes:

a terminal 902, configured to receive resource configuration information of a configured eNB before cross-eNB HO of the terminal 902, and then communicate with the configured eNB 906 according to the corresponding resource configuration information under the condition that the terminal 902 is handed over to a target eNB and the target eNB is the configured eNB 906;

a working eNB 904, configured to determine at least one configured eNB 906 according to a preset condition before the cross-eNB HO of the terminal 902, send context information of the terminal 902 to the configured eNB 906, and send the received resource configuration information of the configured eNB 906 to the terminal 902; and the at least one configured eNB 906, configured to receive and store the context information before the cross-eNB HO of the terminal 902, perform corresponding resource configuration according to the context information, send the resource configuration information to the working eNB 904, and communicate with the terminal 902 according to the resource configuration information under the condition that the configured eNB 906 is the target eNB.

Embodiment 8

Figure 10:
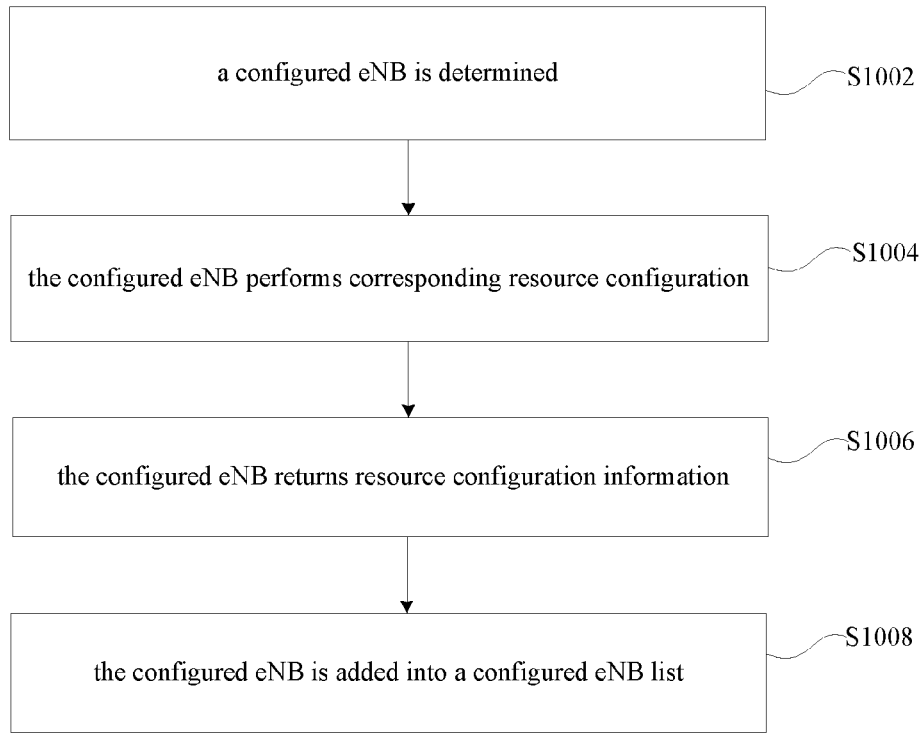
FIG. 10 is a first flowchart of an RRM method according to a preferred embodiment of the disclosure.

FIG. 10 is a first flowchart of an RRM method according to a preferred embodiment of the disclosure, and as shown in FIG. 10, the flow includes the following steps:

Step 1002: a configured eNB is determined.

A first network element judges whether there is an eNB consistent with a configured eNB condition, i.e. a preset condition, or not, or judges whether there is a configured eNB inconsistent with the configured eNB condition or not so as to determine at least one configured eNB. The first network element may be an independent context manager, and may also be a working eNB of a terminal, and a context manager is attached to the working eNB. The context manager is configured to manage context information of the terminal. Under the condition that the context manager is attached to the working eNB, the context manager communicates with another eNB through a port of the eNB; and under the condition that the context manager is an independent network element, the context manager directly communicates with each configured eNB.

Figure 1:
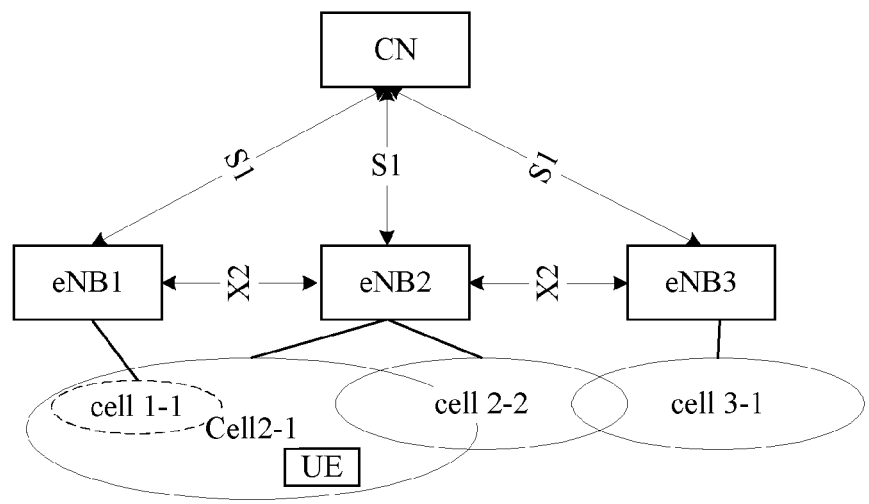
FIG. 1 is a topology diagram of a typical LTE/LTE-A network according to the related technology.
Figure 2:
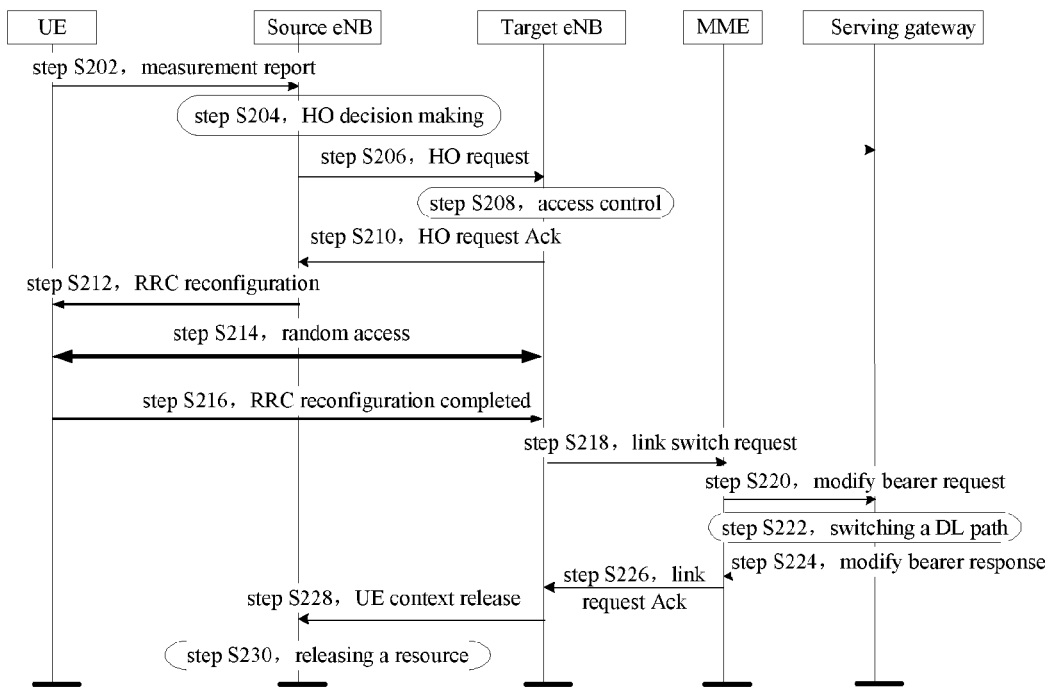
FIG. 2 is a flowchart of X2 HO of LTE according to the related technology.

The configured eNB condition is determined by a specific implementation algorithm, for example, the configured eNB may be an eNB where a neighbour cell of a current cell of the terminal is located. As shown in FIG. 1, when the terminal is currently in Cell2-1, Cell1-1 and Cell2-2 are neighbour cells, the terminal likely enters the two cells in a mobile manner, and eNB1 and eNB2 where Cell1-1 and Cell2-2 are located may further be determined to be more proper configured eNBs, wherein since the terminal has communicated with Cell2-1, eNB2 is a working eNB, and eNB1 may start a subsequent terminal context configuration process as a new configured eNB. The above is only a simple implementation algorithm, the eNB may also configure a lower measurement report threshold of the terminal, and may report some measurement reports in advance before the terminal is actually required to be handed over, so that the network may judge conditions of neighbour cells around the terminal. Since an overhead may occur to the configured eNB, the eNB needs to pre-configure the terminal, some resources may further be required to be reserved, and if the terminal finally does not enter the eNB or the resources are reserved too early, it may cause resource waste; therefore, it is not better if more eNBs are reserved, a selection algorithm for the configured eNB needs to taken HO overhead and configured eNB resources into comprehensive account, and if the eNB that the terminal may enter or leave within a future period of time can be more accurately estimated by the algorithm, a better effect may be achieved. Due to diversity of algorithms, the embodiment of the disclosure is independent of a certain algorithm.

Step 1004: the configured eNB performs corresponding resource configuration.

After the configured eNB is determined, the context manager sends the context information of the terminal to the configured eNB. After receiving the context information of the terminal, the configured eNB stores the context information of the terminal, and performs corresponding resource configuration. The configured eNB may perform resource configuration on the terminal in multiple cells controlled by itself. For example, eNB1 may configure resources of multiple cells such as Cell1-1 and Cell1-2 for the terminal in Cell1-1, Cell1-2 and neighbour cells according to the context of the terminal.

Step 1006: the configured eNB returns resource configuration information.

The new configured eNB returns the resource configuration information of the terminal.

Step 1008: the configured eNB is added into a configured eNB list.

Embodiment 9

Figure 11A:
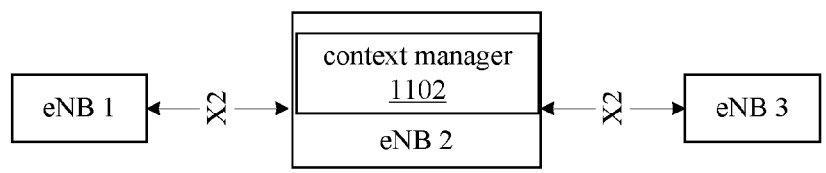
FIG. 11 a is a first network topology diagram of a context manager according to an embodiment of the disclosure.

FIG. 11a is a first network topology diagram of a context manager according to an embodiment of the disclosure, and as shown in FIG. 11a, a context manager 1102 may be a component, and is located on an eNB 2. When serving as a component in the eNB, the context manager may communicate with the eNB by virtue of an inter-eNB interface. Each eNB may realize a function of the component, but for a terminal, only one eNB enables the component, and generally, the component may be selected to be enabled on a working eNB, and the other eNBs are controlled by the eNB. A single-connection terminal may communicate with only one working eNB at the same time, so that a context manager component of a new working eNB is required to work before communication with an original working eNB is stopped, and meanwhile, a context manager component of the original working eNB is disabled, and is controlled by the new working eNB instead. The original working eNB may send some stored configurations of the context manager component to the new working eNB through an inter-eNB interface, wherein the stored configurations mainly include data of a configured eNB list (including working eNB and non-working eNB lists and corresponding resource configuration information), and may further include some RRM measurement data. For a multi-connection terminal, a working eNB capable of enabling a context manager component may be called a master working eNB, one of multiple working eNBs is selected as the master working eNB, a selection principle may be determined according to a practical condition, and will not be defined in the embodiment of the disclosure, and when the master working eNB is required to be changed, a manner the same as that for the single-connection terminal may be adopted, that is, the resource configuration information of the context manager of the original master working eNB is sent to a new master working eNB through an inter-eNB interface, then the function of the context manager of the original master working eNB is disabled, and the function of the context manager of the new master working eNB is enabled.

Figure 11B:
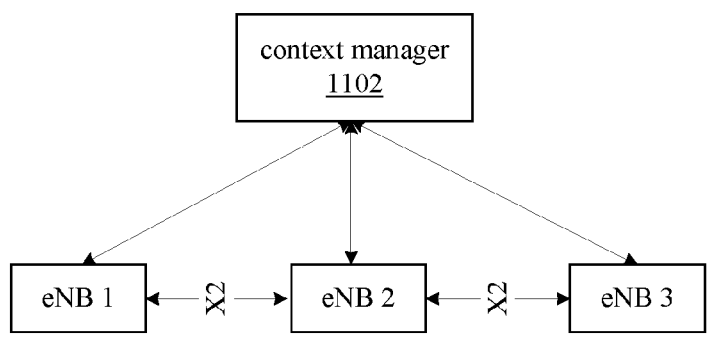

FIG. 11b is a second network topology diagram of a context manager according to an embodiment of the disclosure, and as shown in FIG. 11b, a context manager is an independent network element. When serving as an independent network element, the context manager is connected with each eNB through an interface. When the context manager serves as an independent network element, since the context manager cannot directly communicate with a terminal, it is necessary to forward communication signalling with the terminal between the context manager and a working eNB through interfaces. When the context manager is required to be changed, the working flow is similar to the flow in FIG. 11a, a related configuration is transmitted through an interface between the context managers, and here no more repeated description will not be given.

Embodiment 10

Figure 12:
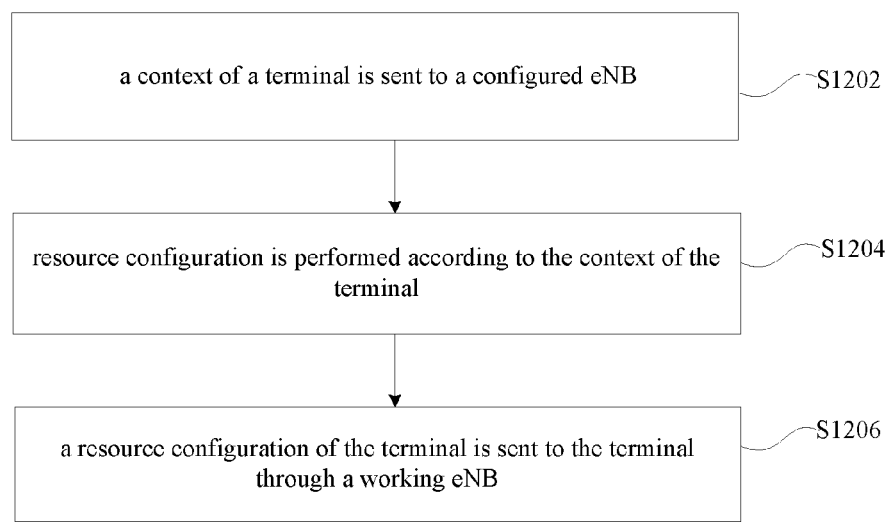
FIG. 12 is a second flowchart of an RRM method according to a preferred embodiment of the disclosure.

FIG. 12 is a second flowchart of an RRM method according to a preferred embodiment of the disclosure, and as shown in FIG. 12, the flow includes the following steps:

Step 1202: a context of a terminal is sent to a configured eNB.

Based on the network architecture of FIG. 11a, when there is a new configured eNB consistent with a configured eNB condition, a working eNB where a context manager is located sends the context of the terminal to the configured eNB. The context of the terminal may substantially be divided into two categories, wherein one category is own information of the terminal unrelated to the eNB where the terminal is located, such as a service E-RAB attribute of the terminal, and the other category is an access layer context, which is a configuration or resource context, such as a transmission context, allocated to the terminal by the eNB, an RRC context including information of a C-RNTI of the terminal, an access layer configuration, a physical cell ID and the like. The working eNB may send all or a part of the context of the terminal to the new configured eNB for the configured eNB to configure context information after the terminal enters the eNB according to the original terminal context.

Step 1204: resource configuration is performed according to the context of the terminal.

The configured eNB allocates the RRC context, such as necessary configurations of a new C-RNTI, a new access layer L2 configuration and a cell broadcast configuration, for the work of the terminal on the eNB according to the service E-RAB attribute in the received context of the terminal, and may even allocate some terminal dedicated resources, such as a dedicated Physical Uplink Control Channel (PUCCH) resource and a dedicated random access pilot to enable the terminal to communicate with the eNB through the configuration when reaching a coverage of a cell of the eNB. The configured eNB may configure radio resources, i.e. RRC resources, of more than one cell for the terminal, if the transmission context is configured, a transmission channel, for example, like a General Packet Radio Service Tunnelling Protocol User Plane (GTP-U) tunnel in a conventional LTE HO process, between two eNBs may be established in advance, and is configured to transmit service data between the eNBs. A to-be-configured eNB is transformed into a non-working configured eNB.

Step 1206: the resource configuration of the terminal is sent to the terminal through the working eNB.

The new non-working eNB sends the resource configuration information of the terminal to the working eNB. Particularly, a reconfiguration message for adding a new cell configuration may be directly generated, and in a form corresponding to similar HO, is sent to the working eNB through an inter-eNB interface generally in a container manner, and then is sent to the terminal by the working eNB. The corresponding resource configuration may also be sent to the working eNB, and then the working eNB generates the reconfiguration message, and sends the reconfiguration message to the terminal. The terminal stores the configuration information of the received configuration, and the storing cell is initially in a non-working state until the working eNB notifies the terminal of communication.

Embodiment 11

Figure 13:
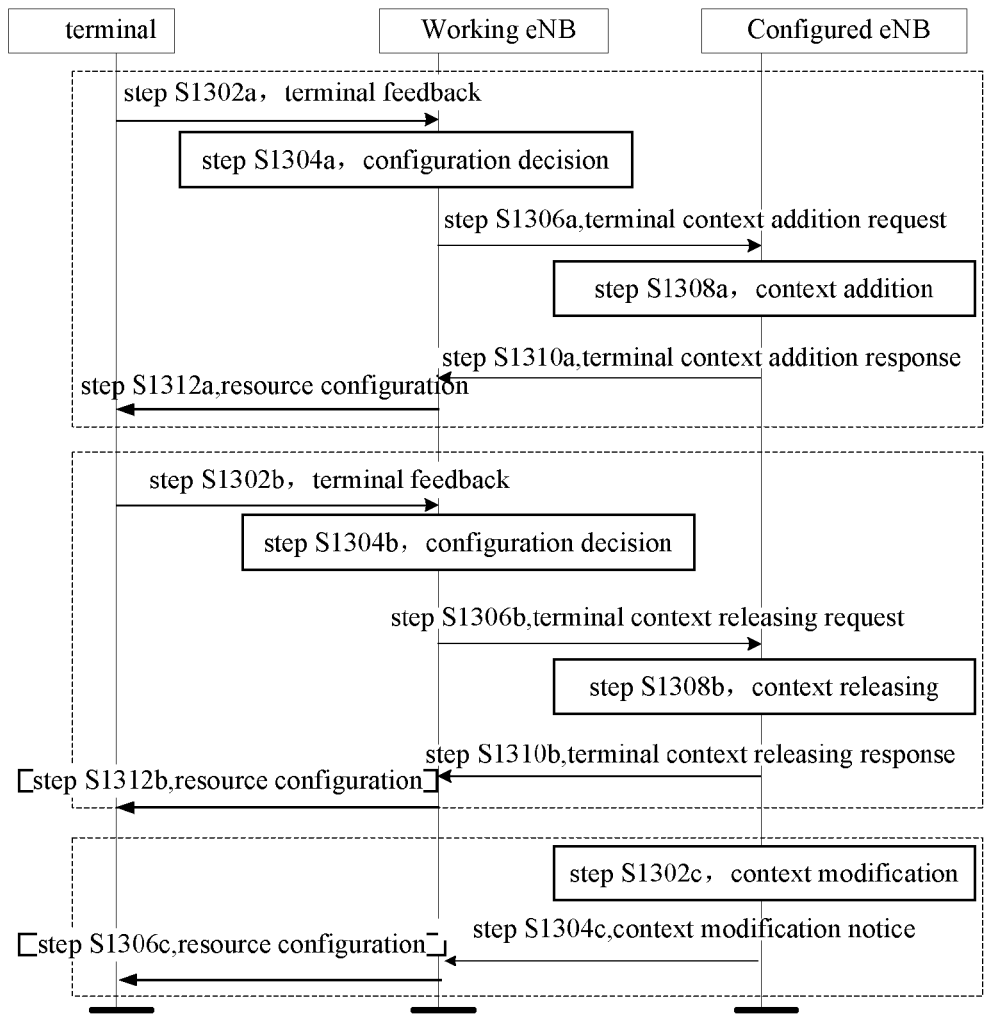
FIG. 13 is a management flowchart of a configured eNB list according to an embodiment of the disclosure.

FIG. 13 is a management flowchart of a configured eNB list according to an embodiment of the disclosure. The embodiment is based on the network architecture of FIG. 11a, and as shown in FIG. 13, the flow includes three sub-flows: an addition flow, a releasing flow and a modification flow. In the embodiment, a working eNB is equivalent to a first network element.

A context addition flow of a configured eNB includes the following steps:

Step 1302a: a terminal sends a feedback.

The terminal sends a terminal feedback to the working eNB.

Step 1304a: a configuration decision is made.

The working eNB makes the configuration decision according to the terminal feedback.

Step 1306a: the working eNB sends a terminal context addition request to the configured eNB.

When it is determined that a new terminal context is required to be added, the working eNB sends the terminal context addition request to the configured eNB.

Step 1308a: the configured eNB adds the terminal context.

Step 1310a: the configured eNB sends a terminal context addition response.

Step 1312a: the working eNB sends a reconfiguration message.

The working eNB sends the reconfiguration message after receiving the context response from the new non-working eNB, and notifies the terminal to store the configuration of the configured eNB.

The releasing flow of the configured eNB includes the following steps:

Step 1302b: the terminal sends a feedback.

The terminal sends a terminal feedback to the working eNB.

Step 1304b: a configuration decision is made.

The working eNB makes the configuration decision according to the terminal feedback.

Step 1306b: the working eNB sends a terminal context releasing request to the configured eNB.

When it is determined that the terminal context is required to be released, the working eNB sends the terminal context releasing request to the configured eNB.

Step 1308b: the configured eNB releases the terminal context.

The configured eNB releases the related terminal contet and a related resource.

Step 1310b: the configured eNB sends a terminal context releasing response.

Step 1312b: the working eNB sends a reconfiguration message.

The working eNB notifies the terminal to release the configuration of the configured eNB after receiving the context response from the configured eNB.

In the process, a terminal context addition message flow may be reused, and in a message, addition and releasing are distinguished by a flag bit, or an independent terminal context releasing message may be used without waiting to receive the response of the eNB. Releasing may be initiated by the working eNB, and may also be executed by the configured eNB, for example, when the terminal has yet not entered the coverage of the cell where the configured eNB is located after a timer is overtime, the configured eNB may delete the context of the terminal by itself, and a resource is correspondingly deleted if being reserved. After deletion, the configured eNB may notify the working eNB that the corresponding terminal context has been deleted. Finally, the working eNB may optionally send a message to the terminal to delete the configuration of the corresponding configured eNB.

When the configuration in the configured eNB is changed, the working eNB may be notified by terminal context modification, and the flow includes the following steps:

Step 1302c: the configured eNB modifies the terminal context.

Step 1304c: the configured eNB sends a terminal context modification notice to the working eNB.

Step 1306c: the working eNB sends new resource configuration information RRC Reconfig to the terminal.

The working eNB performs resource configuration according to the received terminal context modification notice, and sends a new resource configuration to the terminal.

Figure 14:
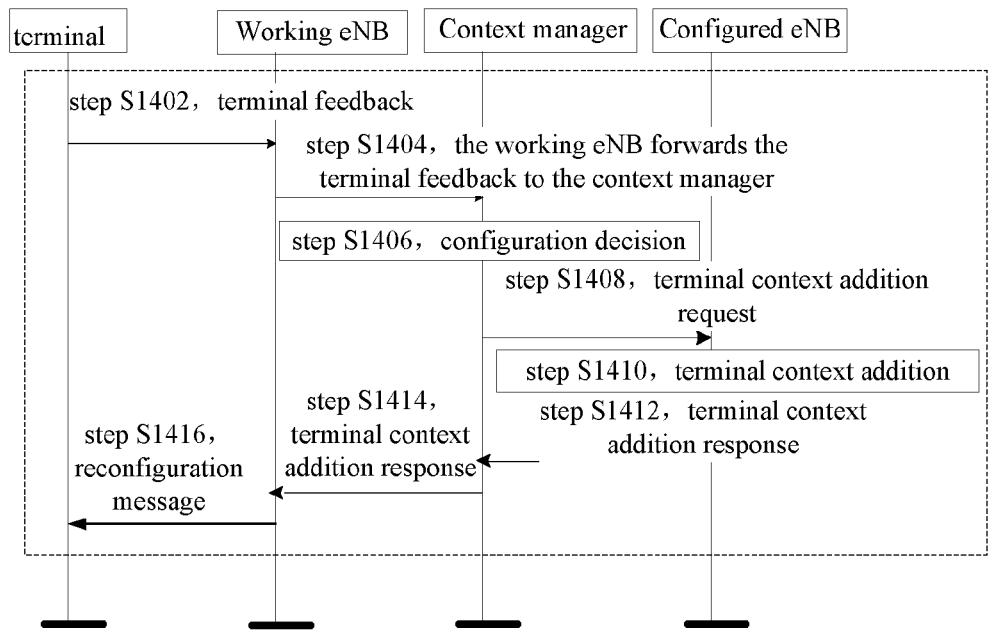
FIG. 14 is a flowchart of context addition according to an embodiment of the disclosure.

The embodiment of the disclosure further provides a context addition method, and FIG. 14 is a flowchart of context addition according to an embodiment of the disclosure. In the embodiment, the context manager serves as an independent network element, that is, the embodiment is based on the network architecture of FIG. 11b, then it is necessary to transmit the feedback information of the terminal and the terminal context addition response or directly the RRC reconfiguration message between the context manager and the working eNB. In the embodiment, the context manager is equivalent to the first network element. As shown in FIG. 14, the flow includes the following steps:

Step 1402: the terminal sends a feedback.

The terminal sends a terminal feedback to the working eNB.

Step 1404: the working eNB forwards the terminal feedback to the context manager.

Step 1406: the context manager makes a configuration decision.

The context manager makes the configuration decision according to the terminal feedback.

Step 1408: the context manager sends a terminal context addition request to the configured eNB.

When it is determined that a new terminal context is required to be added, the context manager sends the terminal context addition request to the configured eNB.

Step 1410: the configured eNB adds the terminal context. The configured eNB stores a context of a related terminal.

Step 1412: the configured eNB sends a terminal context addition response to the context manager.

Step 1414: the context manager sends forwards the terminal context addition response.

Step 1416: the working eNB sends a reconfiguration message.

The working eNB sends the reconfiguration message after receiving the context response from the context manager, and notifies the terminal to store the configuration of the configured eNB.

Embodiment 12

Figure 15:
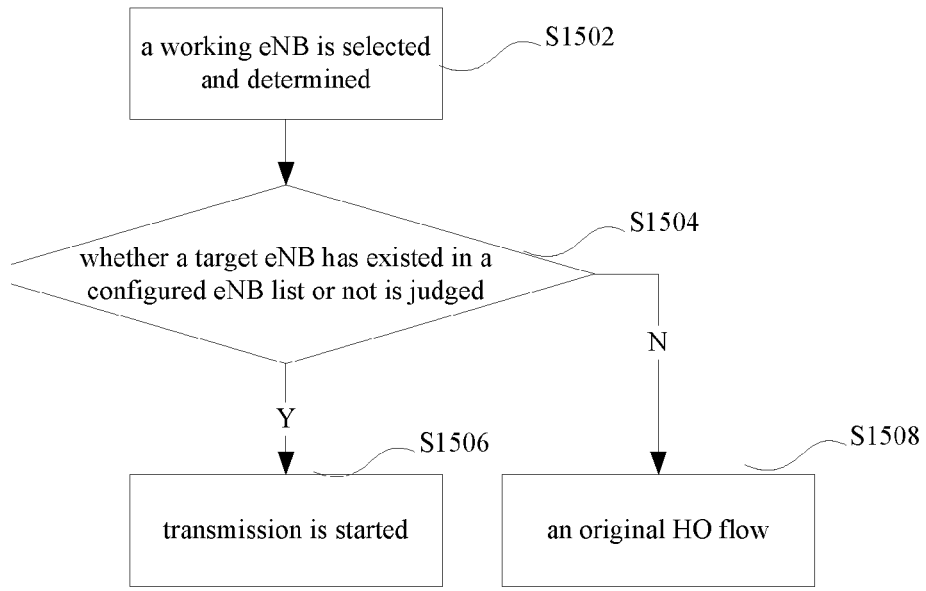
FIG. 15 is a management flowchart of a working eNB according to an embodiment of the disclosure.

FIG. 15 is a management flowchart of a working eNB according to an embodiment of the disclosure, and as shown in FIG. 15, the flow includes the following steps:

Step 1502: a working eNB is selected and determined.

Whether a new working eNB is required to be enabled to communicate with a terminal or not is judged. The judgment is made on the basis of a working eNB management algorithm, and there are many implementation possibilities, for example, the terminal is determined to discover a coverage of a certain cell according to a measurement report of the terminal, or a configuration cell is added for communication according to increase of traffic of the terminal. The disclosure is independent of a specific judgment algorithm, so that there is no limitation.

Step 1504: whether a target eNB has existed in a configured eNB list or not is judged.

If the target eNB has existed in the configured eNB list, Step 1506 is executed, otherwise Step 1508 is executed. Or, whether resource configuration of a target cell has been performed or not may further be judged.

Step 1506: the terminal and the working eNB are notified to start communication.

When there are multiple cells pre-configured under the configured eNB, indication information should contain specific IDs of the cells to indicate the terminal to communicate with the specific cells under the working eNB.

The terminal and the configured eNB start communication after receive the notice.

Step 1508: an HO flow in an existing technology is executed.

Embodiment 13

Figure 16:
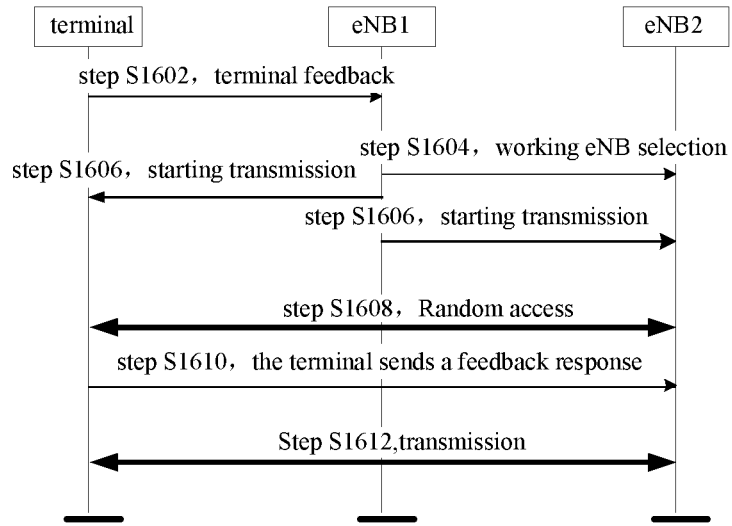
FIG. 16 is a first selection flowchart of a working eNB according to a preferred embodiment of the disclosure.

FIG. 16 is a first selection flowchart of a working eNB according to a preferred embodiment of the disclosure. As shown in FIG. 16, eNB 1 is a working eNB, eNB 2 is a configured eNB, and in the embodiment, the working eNB is equivalent to a first network element. The flow includes the following steps:

Step 1602: a terminal sends a feedback.

The step may also be cancelled.

Step 1604: the working eNB is selected.

The working eNB selection of eNB 1 is triggered by an implementation algorithm. For example, the working eNB may be selected by judging whether to enter a coverage of a certain cell or not according to related measurement information fed back by the terminal, or according to own measurement of the eNB, or according to a load balancing algorithm and the like, or by an algorithm similar to target cell selection in HO, or according to a requirement on the enabling of a cell under a new eNB due to the increase of throughput of the terminal, or the like. In the embodiment of the disclosure, there is no limitation to the algorithms.

After an eNB is selected for transmission, it is necessary to judge whether the eNB has existed in the configured eNB list or not, namely judge whether the eNB has been a non-working eNB or not, and if YES, it is indicated that the eNB has haven a context and/or resource configuration information of the terminal, and the non-working eNB can be instantly notified to be transformed into a working eNB to start communicating with the terminal. In the embodiment, it is supposed that eNB 2 is selected and eNB2 is a new working eNB, i.e. the target eNB. Or, whether the eNB of a target cell required to start communication is in the configured eNB list or not is judged, and whether the resource configuration of the target cell has been performed or not is judged.

eNB 1 notifies eNB 2 to start transmission, a notification message may contain indication information about a specific cell under eNB 2, and DL data is transmitted to eNB 2 through an inter-eNB interface.

Step 1606: transmission is started.

eNB 1 simultaneously notifies the terminal to start transmission with the cell under eNB 2. eNB 1 notifies the terminal and eNB 2 to start work, and a notification message may contain the indication information about the specific cell under eNB 2. The DL data is transmitted to eNB 2 through the inter-eNB interface. The terminal starts receiving data in the cell under eNB 2. Since the notification message arriving at the terminal has a transmission time delay and a processing time delay, eNB 2 may send data to the terminal after T milliseconds, T may be configured or agreed according to a protocol, and uplink data is transmitted to eNB 2 through the inter-eNB interface.

Step 1608: random access is performed.

If uplink synchronization is not finished between the terminal and eNB 2, the terminal must perform random access in the cell of the eNB, and after synchronization is finished by random access, a response message is sent or the eNB is waited to start transmission with the terminal.

Or, eNB 1 in Step 1606 notifies the terminal and eNB 2 to start work, eNB 2 starts data transmission after the terminal performs feedback on eNB 2 rather than waiting for the processing notification of the terminal for fixed T milliseconds. That is, regardless of whether uplink synchronization is finished between the terminal and eNB 2 or not, after the terminal receives the notice of eNB 1, the terminal performs random access in the specified cell of eNB 2.

Step 1610: the terminal sends a feedback response.

The terminal sends the feedback response to eNB 2. The terminal may utilize dedicated random access or send its own identification information such as identification information like a C-RNTI pre-allocated to the terminal to enable eNB 2 to identify a connection of the terminal and use configuration information corresponding to the terminal.

Step 1612: transmission is performed.

eNB 2 starts transmission with the terminal, the DL data sent by eNB 1 through the inter-eNB interface is sent to the terminal, and uplink data from the terminal is sent to eNB 1 through the inter-eNB interface.

If it is necessary to stop communication between eNB 1 and the terminal, it is necessary to switch a data stream of a CN and eNB 1 to eNB 2 by a path switch process. eNB 1 transmits an uncompleted data packet back to eNB 2 through an inter-eNB transmission channel.

Figure 17:
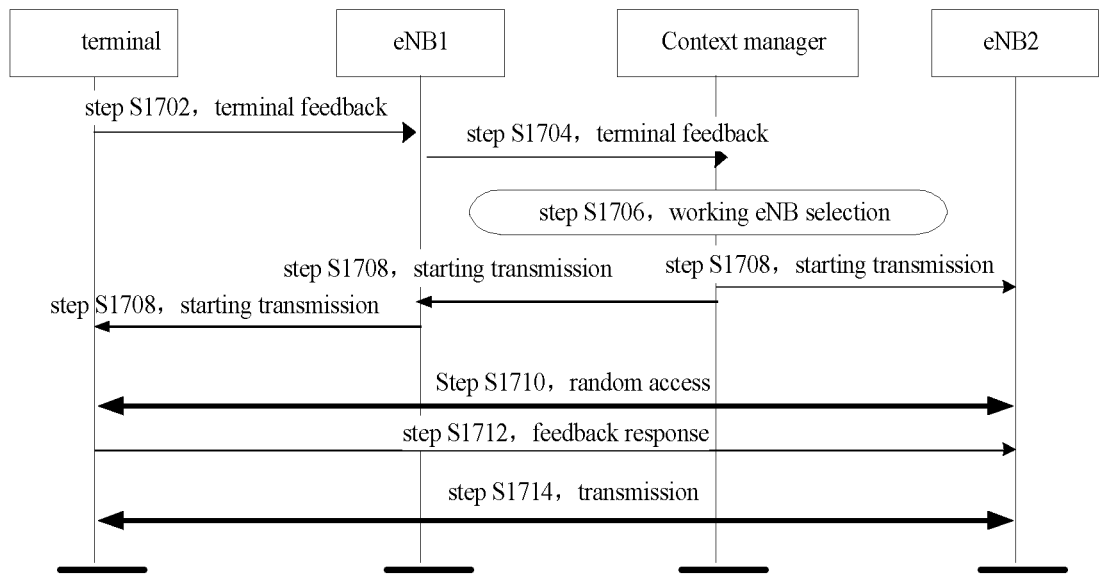
FIG. 17 is a second selection flowchart of a working eNB according to a preferred embodiment of the disclosure.

FIG. 17 is a second selection flowchart of a working eNB according to a preferred embodiment of the disclosure. As shown in FIG. 17, eNB 1 is a working eNB, eNB 2 is a configured eNB, and the flow includes the following steps:

Step 1702: the terminal sends a feedback.

Step 1704: the working eNB forwards the terminal feedback to a context manager.

Step 1706: the context manager selects the working eNB.

The working eNB selection of the context manager is triggered by an implementation algorithm. For example, the working eNB may be selected by judging whether to enter a coverage of a certain cell or not according to related measurement information fed back by the terminal, or according to measurement of the working eNB, or according to a load balancing algorithm and the like, or by an algorithm similar to target cell selection in HO. In the embodiment of the disclosure, there is no limitation to the algorithms.

After an eNB is selected for transmission, it is necessary to judge whether the eNB has existed in the configured eNB list or not, and if YES, it is indicated that the eNB has haven a context of the terminal, and the configured eNB can be directly notified to be transformed into a working eNB to start communicating with the terminal. In the embodiment, it is supposed that eNB 2 is selected and eNB2 is a new working eNB.

Step 1708: transmission is started.

The context manager notifies the terminal and eNB 2 to start work through eNB 1. The terminal starts receiving data in the cell under eNB 2. Since the message arriving at the terminal has a transmission time delay and a processing time delay, eNB 2 may send data to the terminal after T milliseconds, and T may be configured or agreed according to a protocol.

Step 1710: random access is performed.

If the terminal is unsynchronized with eNB 2, the terminal must perform random access in the cell of the eNB, and after synchronization is finished by random access, a response message is sent or the eNB is waited to start transmission with the terminal.

Or, eNB 1 notifies the terminal and eNB 2 to start work, and regardless of whether the terminal is synchronized with eNB 2 or not, the terminal performs random access in the cell of eNB 2.

Step 1712: the terminal sends a feedback response.

The terminal sends the feedback response to eNB 2. The terminal may utilize dedicated random access or send its own identification information such as identification information like a C-RNTI pre-allocated to the terminal to enable eNB 2 to identify a connection of the terminal.

Step 1714: transmission is performed.

eNB 2 starts transmission with the terminal after receiving the response.

Embodiment 14

Figure 18:
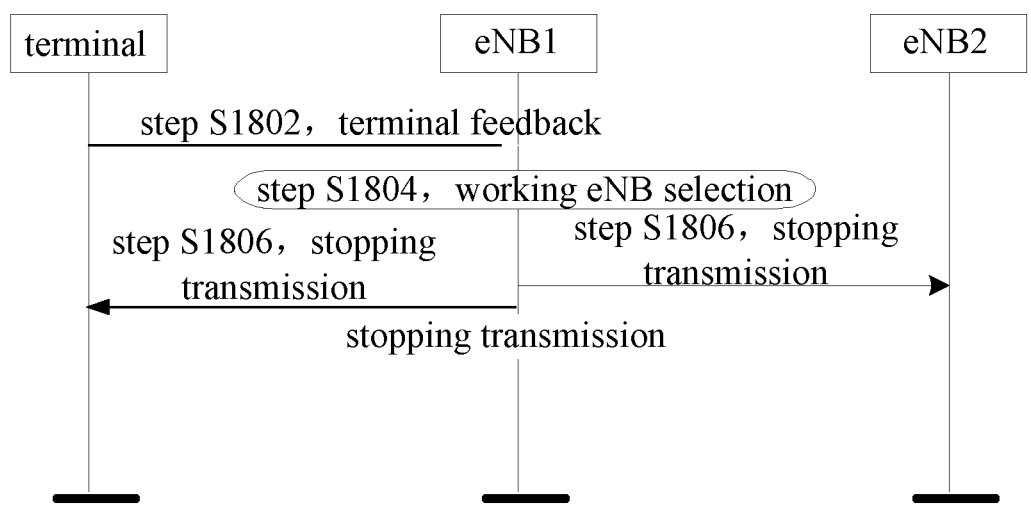
FIG. 18 is a flowchart of stopping transmission of a working eNB according to an embodiment of the disclosure.

FIG. 18 is a flowchart of stopping transmission of a working eNB according to an embodiment of the disclosure. As shown in FIG. 18, eNB 1 is a working eNB, eNB 2 is a configured eNB, and the flow includes the following steps:

Step 1802: a terminal sends a feedback.

Step 1804: the working eNB is selected.

The selection and judgment of the working eNB may be triggered by an implementation algorithm. For example, for a multi-connection terminal, when there are multiple working eNBs at the same time, the eNB which has not been suitable for transmission is judged, and transmission of the working eNB may be stopped.

Step 1806: transmission is stopped.

eNB 1 sends a transmission stopping message to eNB 2, and then eNB 2 stops transmission. If there is still unprocessed data in a cache of eNB 2, the data is transmitted to a working eNB, such as eNB 1, which still works, through an inter-eNB channel.

eNB 1 sends a message to notify the terminal to stop receiving the data at eNB 2.

Embodiment 15

A single-connection terminal may communicate with only one working eNB at the same time, so that eNB 2 may start transmission at first by the abovementioned flow, and then transmission of eNB 1 is stopped. Or, in order to combine two flows of signalling between the eNBs, transmission of an old working eNB is stopped when a new working eNB is started.

The working eNB stops own transmission when transmission of a configured eNB is started. The terminal stops transmission with eNB 1 and starts transmission with eNB 2 when receiving a transmission starting notice. eNB 1 transmits unprocessed data in a cache to eNB 2 through an inter-eNB channel.

In addition, the single-connection terminal may communicate with only one working eNB at the same time, for a data stream from the eNB to a CN, the terminal communicates with a new working eNB, i.e. eNB 2, after finishing the abovementioned process, eNB 2 forwards the data stream to the CN through the original working eNB, i.e. eNB 1, original S1 is kept unchanged, and data is transmitted to eNB 1 through an inter-eNB interface. Or, S1 connection is modified to eNB 2, then eNB 2 sends path switch to the CN to switch a data channel between eNB 1 and the CN to eNB 2 by virtue of an original path switch process, and eNB 1 transmits an uncompleted data packet back to eNB 2 through an inter-eNB transmission channel.

If a terminal has a multi-connection transmission capability, the terminal may perform transmission with more than one eNB at the same time, and in the abovementioned process, the terminal may communicate with eNB 1 and eNB 2 at the same time, that is, transmission with eNB 1 may still be maintained during the random access or transmission of the terminal with new eNB 2. eNB 1 is an anchor point of S1 connection, the data stream sent by the CN is divided, is sent to eNB 2 through the connection between eNB 1 and the terminal and the inter-eNB transmission channel respectively, and is transmitted to the terminal through the connection between eNB 2 and the terminal, and meanwhile, the data of eNB 1 and eNB 2 are converged and sent to the CN. The anchor point of S1 connection may also be modified to eNB 2 through a path switch flow.

For a terminal in consideration of compatibility with LTE/LTE-A, i.e. under the condition of not modifying the terminal, if a target eNB can be added into a configured eNB set in advance before the terminal reaches an HO cell, a source eNB, i.e. the working eNB, may finish the preparation work of the configured eNB set by the abovementioned process, and different from FIG. 13 and FIG. 14, after the configured eNB finishes the addition of a terminal context, an RRC reconfiguration is not sent to the terminal at first, but is locally temporarily stored. When the working eNB is changed or a new working eNB is to be enabled, as shown in FIG. 15 and FIG. 16, in the whole process that the RRC reconfiguration is sent to the terminal instead of a transmission starting message, the terminal may be handed over according to an original LTE flow and the terminal sends a feedback to finish RRC reconfiguration, the terminal is not influenced, and is not required to be modified; and since the target eNB has finished the switch request process in advance, only air interface reconfiguration is required by the whole HO request process, so that benefits of shortening an HO time delay, reducing HO interruption, increasing throughput, reducing the probability of HO failure, and the like are achieved.

If the original working eNB discovers that the target eNB is not in the configured eNB set, or that the target cell is not in resource configuration cells of the configured eNB, HO may be executed according to the original LTE HO process.

From the above, it can be seen that the embodiment of the disclosure has technical effects as follows: an HO success rate is increased, service interruption is short, an HO time delay is short, and signalling overhead is low.

Obvious, those skilled in the art should know that each component or step of the disclosure may be implemented by a universal computing device, and the components or steps may be concentrated on a single computing device or distributed on a network formed by at least two computing devices, and may optionally be implemented by programmable codes executable for the computing devices, so that the components or steps may be stored in a storage device for execution with the computing devices. Moreover, the shown or described steps may be executed in a sequence different from that described here under a certain condition, or may form each integrated circuit component, or multiple components or steps therein may form a single integrated circuit component for implementation. As a consequence, the invention is not limited to any specific hardware and software combination.

The above is only the preferred embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

INDUSTRIAL PRACTICABILITY

From the above, the RRM method, device and system provided by the embodiment of the disclosure have beneficial effects as follows: an HO success rate is increased, service interruption is short, an HO time delay is short, and signalling overhead is low.

What is claimed is:

1. A Radio Resource Management (RRM) method, comprising:
  judging, by a first network element, whether a target Evolved Universal Terrestrial Radio Access Network NodeB (eNB) of a terminal is a configured eNB or not, wherein the configured eNB is an eNB pre-storing context information of the terminal; and
  under a condition that the target eNB is the configured eNB, sending, by the first network element, a notice of performing communication according to the corresponding context information to the configured eNB and the terminal respectively;
  wherein before the first network element judges whether the target eNB is the configured eNB or not, the method further comprises: determining, by the first network element, the configured eNB, and sending the context information to the configured eNB; and receiving and storing, by the first network element, resource configuration information returned, according to the context information, by the configured eNB, and storing information of the configured eNB into a configured eNB list_wherein under a condition that the first network element is an eNB, the first network element sends the configured eNB list to a new first network element.

2. The method according to claim 1, wherein after the resource configuration information is received, the method further comprises:
  sending the resource configuration information to the terminal to enable the terminal to communicate with the configured eNB according to the resource configuration information.

3. The method according to claim 1, comprising:
  receiving, by the configured eNB, the notice of communicating with the terminal from the first network element; and
  according to the context information, communicating, by the configured eNB, with the terminal under an instruction of the notice.

4. The method according to claim 3, wherein before the notice is received, the method further comprises:
  performing, by the configured eNB, resource configuration according to the context information, and sending the resource configuration information to the terminal through the first network element.

5. The method according to claim 4, wherein communicating with the terminal according to the context information comprises communicating with the terminal according to the resource configuration information.

6. The method according to claim 3, further comprising at least one of:
  releasing, by the configured eNB, the context information of the terminal according to a received release request; and modifying, by the configured eNB, the context information of the terminal, and notifying the first network element.

7. The method according to claim 6, wherein after communicating with the terminal, the method further comprises:
under a condition that the first network element is an eNB, the configured eNB stopping communicating with the terminal after receiving a communication stopping notice from a new first network element; and
under a condition that the first network element is an independent context manager, the configured eNB stopping communicating with the terminal after receiving a communication stopping notice from the first network element, wherein the context manager is connected with the configured eNB, and is configured to manage the context information.

8. A Radio Resource Management (RRM) method, comprising:
receiving, by a terminal, resource configuration information sent by a configured Evolved Universal Terrestrial Radio Access Network NodeB (eNB) through a first network element, wherein the configured eNB is an eNB pre-storing context information of the terminal; and
the terminal communicating with the configured eNB according to the resource configuration information after receiving a notice of communicating with the configured eNB from the first network element;
wherein the first network element determining the configured eNB, and sending the context information to the configured eNB; the first network element receiving and storing the resource configuration information returned, according to the context information, by the configured eNB, and storing information of the configured eNB into a configured eNB list, wherein under a condition that the first network element is an eNB, the first network element sending the configured eNB list to a new first network element.

9. A Radio Resource Management (RRM) device, wherein the device is located in a first network element and comprises:
a judgment component configured to judge whether a target Evolved Universal Terrestrial Radio Access Network NodeB (eNB) of a terminal is a configured eNB or not, wherein the configured eNB is an eNB pre-storing context information of the terminal; and
a sending component configured to, under a condition that the target eNB is the configured eNB, send a notice of performing, according to the corresponding context information, communication to the configured eNB and the terminal respectively;
wherein the sending component is further configured to determine the configured eNB, and send the context information to the configured eNB; and
the device further comprises a receiving component, configured to receive and store resource configuration information returned, according to the context information, by the configured eNB, and store information of the configured eNB into a configured eNB list; the sending component is further configured to, under a condition that the first network element is an eNB, send the configured eNB list to a new first network element.

10. The device according to claim 9, wherein the sending component is further configured to send the resource configuration information to the terminal to enable the terminal to communicate with the configured eNB according to the resource configuration information.

11. A Radio Resource Management (RRM) device, located in a configured Evolved Universal Terrestrial Radio Access Network NodeB (eNB), wherein the configured eNB is an eNB pre-storing context information of a terminal and the device comprises:
an eNB receiving component configured to receive a notice of communicating with the terminal from a first network element; and
an eNB communication component configured to, according to the context information, communicate with the terminal under an instruction of the notice;
wherein the configured eNB is determined by the first network element, and receives the context information from the first network element; the first network element receives and stores resource configured information returned, according to the context information stored in the configured eNB, by the configured eNB, into a configured eNB list
and
receiving and storing, by the first network element, resource configuration information returned, according to the context information, by the configured eNB, and storing information of the configured eNB into a configured eNB list; wherein under a condition that the first network element is an eNB, the configured eNB list is sent to a new first network element.

12. The device according to claim 11, further comprising an eNB configuration component configured to perform resource configuration according to the context information, and send the resource configuration information to the terminal through the first network element.

13. The device according to claim 12, wherein the eNB communication component is configured to communicate with the terminal according to the resource configuration information.

14. The device according to claim 11, further comprising at least one of:
a releasing component configured to release the context information of the terminal according to a received release request; and
a modification component configured to modify the context information of the terminal, and notify the first network element.

15. A Radio Resource Management (RRM) device, wherein the device is located in a terminal and comprises:
a terminal receiving component configured to receive resource configuration information sent by a configured Evolved Universal Terrestrial Radio Access Network NodeB (eNB) through a first network element, wherein the configured eNB is an eNB pre-storing context information of the terminal; and
a terminal communication component configured to communicate with the configured eNB according to the resource configuration information after receiving a notice of communicating with the configured eNB from the first network element;
wherein the first network element determining the configured eNB, and sending the context information to the configured eNB; the first network element receiving and storing the resource configuration information returned, according to the context information, by the configured eNB, and storing information of the configured eNB into a configured eNB list, wherein under a condition that the first network element is an eNB, the first network element sending the configured eNB list to a new first network element.

16. A Radio Resource Management (RRM) system, comprising:

a terminal configured to receive resource configuration information of at least one configured Evolved Universal Terrestrial Radio Access Network NodeB (eNB) before cross-eNB Handover (HO) of the terminal, and then communicate with the at least one configured eNB according to the corresponding resource configuration information under a condition that the terminal is handed over to a target eNB and the target eNB is the configured eNB;

a working eNB configured to determine at least one configured eNB according to a preset condition before the cross-eNB HO of the terminal, send context information of the terminal to the configured eNB, and send the received resource configuration information of the configured eNB to the terminal; and the at least one configured eNB configured to receive and store the context information before the cross-eNB HO of the terminal, perform corresponding resource configuration according to the context information, send the resource configuration information to the working eNB, and communicate with the terminal according to the resource configuration information under a condition that the at least one configured eNB is the target eNB;

wherein a first network element determining the configured eNB, and sending the context information to the configured eNB; the first network element receiving and storing the resource configuration information returned, according to the context information, by the configured eNB, and storing information of the configured eNB into a configured eNB list, wherein under a condition that the first network element is an eNB, the first network element sending the configured eNB list to a new first network element.

* * * * *